(12) United States Patent
Bagheri et al.

(10) Patent No.: US 11,968,687 B2
(45) Date of Patent: *Apr. 23, 2024

(54) SCHEDULING OF TRANSMISSION TIME INTERVALS

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,175

(22) Filed: Apr. 11, 2022

(65) Prior Publication Data

US 2022/0240299 A1 Jul. 28, 2022

Related U.S. Application Data

(63) Continuation of application No. 16/926,673, filed on Jul. 11, 2020, now Pat. No. 11,310,824, which is a
(Continued)

(51) Int. Cl.
*H04W 72/12* (2023.01)
*H04W 72/21* (2023.01)
(Continued)

(52) U.S. Cl.
CPC .......... *H04W 72/23* (2023.01); *H04W 72/21* (2023.01); *H04W 72/535* (2023.01); *H04W 72/0446* (2013.01)

(58) Field of Classification Search
CPC .......... H04W 72/1289; H04W 72/042; H04W 72/1257; H04W 72/1284; H04W 72/0446; H04W 72/23; H04W 72/21; H04W 72/535

See application file for complete search history.

(56) References Cited

U.S. PATENT DOCUMENTS 9,451,610 B2    9/2016  Ohta et al.
10,091,773 B2 * 10/2018  Seo ..................... H04W 72/23
(Continued)

OTHER PUBLICATIONS

U.S. Appl. No. 16/926,668 "Office Action Summary", dated Sep. 2, 2022, pp. 1-33.
(Continued)

*Primary Examiner* — Wutchung Chu
(74) *Attorney, Agent, or Firm* — Kunzler Bean & Adamson (57) ABSTRACT

Apparatuses, methods, and systems are disclosed for scheduling of transmission time intervals. One apparatus includes a processor that determines a first semi-persistent scheduling resource assignment indicating a first set of resources including a first multiple time domain resources. Each time domain resource of the first multiple time domain resources has a first transmission time interval length. The processor also determines a second semi-persistent scheduling resource assignment indicating a second set of resources including a second multiple time domain resources. Each time domain resource of the second multiple time domain resources has a second transmission time interval length, and the first transmission time interval length is different from the second transmission time interval length. The apparatus includes a transmitter that transmits the first semi-persistent scheduling resource assignment using a first semi-persistent scheduling radio network identifier, and
(Continued)

transmits the second semi-persistent scheduling resource assignment using a second semi-persistent scheduling radio network identifier.

20 Claims, 8 Drawing Sheets

Related U.S. Application Data continuation of application No. 15/458,773, filed on Mar. 14, 2017, now Pat. No. 10,728,922.

(60) Provisional application No. 62/321,657, filed on Apr. 12, 2016.

(51) Int. Cl.
*H04W 72/23* (2023.01)
*H04W 72/50* (2023.01)
*H04W 72/0446* (2023.01)

(56) References Cited

U.S. PATENT DOCUMENTS

| | | | |
|---|---|---|---|
| 10,142,914 B2 | 11/2018 | Yang et al. | |
| 10,524,554 B2 | 1/2020 | Kim et al. | |
| 10,541,785 B2 | 1/2020 | Papasakellariou | |
| 10,638,491 B2 | 4/2020 | Fujishiro et al. | |
| 10,750,533 B2* | 8/2020 | Lee | H04W 72/23 |
| 11,190,255 B2 | 11/2021 | Zhou et al. | |
| 2009/0232095 A1* | 9/2009 | Ahn | H04W 74/006 |
| | | | 370/331 |
| 2009/0245194 A1 | 10/2009 | Damnjanovic et al. | |
| 2010/0034158 A1 | 2/2010 | Meylan | |
| 2010/0074200 A1 | 3/2010 | Li et al. | |
| 2011/0103327 A1 | 5/2011 | Lee et al. | |
| 2011/0223924 A1 | 9/2011 | Lohr et al. | |
| 2011/0292845 A1 | 12/2011 | Hu et al. | |
| 2011/0310777 A1 | 12/2011 | Jiang et al. | |
| 2012/0082119 A1 | 4/2012 | Chung et al. | |
| 2012/0093096 A1 | 4/2012 | Barbieri et al. | |
| 2012/0140708 A1* | 6/2012 | Choudhury | H04L 1/0027 |
| | | | 370/328 |
| 2012/0327867 A1 | 12/2012 | Kela et al. | |
| 2013/0016686 A1 | 1/2013 | Li et al. | |
| 2013/0100936 A1 | 4/2013 | Pettersson | |
| 2013/0107822 A1* | 5/2013 | Papasakellariou | H04W 72/04 |
| | | | 370/329 |
| 2013/0142142 A1 | 6/2013 | McBeath et al. | |
| 2013/0322378 A1* | 12/2013 | Guan | H04W 72/12 |
| | | | 370/329 |
| 2013/0343252 A1 | 12/2013 | Chakraborty et al. | |
| 2014/0036889 A1 | 2/2014 | Kim et al. | |
| 2014/0133428 A1 | 5/2014 | Kazmi et al. | |
| 2014/0161069 A1 | 6/2014 | Ohta et al. | |
| 2014/0241262 A1 | 8/2014 | Novak et al. | |
| 2014/0362832 A1 | 12/2014 | Rudolf et al. | |
| 2015/0016311 A1 | 1/2015 | Han et al. | |
| 2015/0098371 A1 | 4/2015 | Vajapeyam et al. | |
| 2015/0289144 A1 | 10/2015 | Yi et al. | |
| 2015/0350944 A1 | 12/2015 | Chen et al. | |
| 2015/0350994 A1 | 12/2015 | Chen et al. | |
| 2016/0095137 A1 | 3/2016 | Chen et al. | |
| 2016/0119969 A1 | 4/2016 | Vajapeyam et al. | |
| 2016/0211950 A1* | 7/2016 | Cheng | H04W 72/23 |
| 2016/0242176 A1 | 8/2016 | Sun et al. | |
| 2016/0330011 A1* | 11/2016 | Lee | H04L 5/14 |
| 2017/0094676 A1 | 3/2017 | Kim et al. | |
| 2017/0118701 A1 | 4/2017 | Kim et al. | |
| 2017/0142743 A1 | 5/2017 | Yoon et al. | |
| 2017/0149543 A1 | 5/2017 | Ang et al. | |
| 2017/0195890 A1* | 7/2017 | Chen | H04W 72/0446 |
| 2017/0223687 A1 | 8/2017 | Kuchibhotla et al. | |
| 2017/0223695 A1 | 8/2017 | Kwak et al. | |
| 2017/0289733 A1 | 10/2017 | Rajagopal et al. | |
| 2018/0048498 A1* | 2/2018 | Stern-Berkowitz | |
| | | | H04L 5/0091 |
| 2018/0070367 A1 | 3/2018 | Fujishiro et al. | |
| 2018/0109353 A1 | 4/2018 | Kwak et al. | |
| 2018/0160445 A1 | 6/2018 | Babaei et al. | |
| 2018/0242389 A1 | 8/2018 | Phuyal et al. | |
| 2018/0310335 A1 | 10/2018 | Tang et al. | |
| 2018/0324839 A1 | 11/2018 | Feng | |
| 2018/0359745 A1* | 12/2018 | Yeo | H04L 5/0055 |
| 2018/0375619 A1* | 12/2018 | Hwang | H04L 1/1854 |
| 2019/0014598 A1* | 1/2019 | Yoshimura | H04L 5/0053 |
| 2019/0029033 A1 | 1/2019 | Tang et al. | |
| 2019/0036758 A1* | 1/2019 | Takeda | H04L 5/14 |
| 2019/0037539 A1 | 1/2019 | Jung et al. | |
| 2019/0058516 A1 | 2/2019 | Yang et al. | |
| 2019/0110311 A1* | 4/2019 | Falconetti | H04W 72/0453 |
| 2019/0116007 A1* | 4/2019 | Yi | H04W 72/0453 |
| 2019/0116607 A1 | 4/2019 | Yi et al. | |
| 2019/0116608 A1 | 4/2019 | Kim et al. | |
| 2019/0116609 A1* | 4/2019 | Feng | H04W 72/1263 |
| 2019/0116611 A1* | 4/2019 | Lee | H04W 72/20 |
| 2019/0116626 A1 | 4/2019 | Zhao | |
| 2019/0124697 A1 | 4/2019 | Tirronen et al. | |
| 2020/0120688 A1* | 4/2020 | Kim | H04W 72/12 |
| 2020/0344793 A1 | 10/2020 | Bagheri et al. | |
| 2020/0344794 A1 | 10/2020 | Bagheri et al. | |
| 2020/0396733 A1* | 12/2020 | Takano | H04L 5/1469 |
| 2021/0112420 A1 | 4/2021 | Vajapeyam et al. | |
| 2021/0410159 A1 | 12/2021 | Kim et al. | |
| 2022/0232564 A1 | 7/2022 | Behravan et al. | |
| 2022/0240297 A1 | 7/2022 | Bagheri et al. | |

OTHER PUBLICATIONS

Oppo, "Discussion on TTI shortening", 3GPP TSG WG1 Meeting #84bis R1-162339, Busan Korea, Apr. 11-15, 2016, 4 pages.

Ericsson, "Email discussion report for [91bis#33] [LTE/LATRED]—L2 enhancements", 3GPP TSG-RAN WG2 #92, R2-156658, Anaheim, USA, Nov. 15-20, 2015, 6 pages.

Ericsson, "Skip padding option for UL grants", 3GPP TSG-RAN WG2 #93 bis R2-162782, Dubrovnik, Croatia, Apr. 11-15, 2016, 5 pages.

Huawei, Hisilicon, "View on TTI length", 3GPP TSG RAN WG1 Meeting #84bis R1-162108, Busan, Korea, Apr. 11-15, 2016, 5 pages.

U.S. Appl. No. 16/926,668 "Office Action Summary", dated May 12, 2022, pp. 1-31.

U.S. Appl. No. 17/718,108 "Office Action Summary", dated Dec. 5, 2022, pp. 1-33.

U.S. Appl. No. 16/926,668 "Office Action Summary", dated Dec. 22, 2022, pp. 1-38.

* cited by examiner

SCHEDULING OF TRANSMISSION TIME INTERVALS

CROSS REFERENCE TO RELATED APPLICATIONS

This application is a continuation application of U.S. patent application Ser. No. 16/926,673, filed on Jul. 11, 2020, which is a continuation application of U.S. patent application Ser. No. 15/458,773, filed on Mar. 14, 2017, which claims priority to U.S. Patent Application Ser. No. 62/321,657 entitled "SCHEDULING OF TRANSMISSION TIME INTERVALS" and filed on Apr. 12, 2016 for Hossein Bagheri et al., all of which are incorporated herein by reference in their entirety.

FIELD

The subject matter disclosed herein relates generally to wireless communications and more particularly relates to scheduling of transmission time intervals ("TTIs") in a wireless communication system.

BACKGROUND

In wireless communications networks, a frame structure for long term evolution ("LTE") frequency division duplex ("FDD") may be used. Alternatively, a frame structure for time division duplex ("FDD") may be used. A radio frame of 10 milliseconds ("ms") may include 10 subframes, each of which is 1 ms. Each subframe further may include two slots, each of which is 0.5 ms. Within each slot, a number of orthogonal frequency-division multiplexing ("OFDM") symbols may be transmitted. The transmitted signal in each slot on an antenna port may be described by a resource grid comprising $N_{RB}^{DL} N_{sc}^{RB}$ subcarriers and $N_{symb}^{DL}$ OFDM symbols, where $N_{RB}^{DL}$ is a number of resource blocks ("RBs") in the downlink ("DL") (which is dependent on the transmission bandwidth of a cell); $N_{sc}^{RB}$ is the number of subcarriers in each RB; and each subcarrier occupies a certain frequency of size $\Delta f$. The values of $N_{sc}^{RB}$, $\Delta f$, and $N_{symb}^{DL}$ may depend on a cyclic prefix as shown in Table 1.

TABLE 1

| Configuration | | $N_{sc}^{RB}$ | $N_{symb}^{DL}$ |
|---|---|---|---|
| Normal Cyclic Prefix | $\Delta f$ = 15 kHz | 12 | 7 |
| Extended Cyclic Prefix | $\Delta f$ = 15 kHz | | 6 |
| | $\Delta f$ = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain wireless communication networks, the transmission time interval ("TTI") may be 1 ms. In other wireless communication networks, such as networks using shortened TTIs ("s-TTIs"), the s-TTI may be less than 1 ms. In such wireless communication networks, semi-persistent scheduling ("SPS") may be used. In some wireless communication networks, scheduling conflicts may occur.

BRIEF SUMMARY

Apparatuses for scheduling of transmission time intervals are disclosed. Methods and systems also perform the functions of the apparatus. In one embodiment, an apparatus includes a processor that determines a first semi-persistent scheduling resource assignment indicating a first set of resources, the first set of resources including a first multiple time domain resources. In such an embodiment, each time domain resource of the first multiple time domain resources has a first transmission time interval length. The processor also determines a second semi-persistent scheduling resource assignment indicating a second set of resources, the second set of resources including a second multiple time domain resources. In such embodiments, each time domain resource of the second multiple time domain resources has a second transmission time interval length, and the first transmission time interval length is different from the second transmission time interval length. In certain embodiments, the apparatus includes a transmitter that transmits the first semi-persistent scheduling resource assignment using a first semi-persistent scheduling radio network identifier, and transmits the second semi-persistent scheduling resource assignment using a second semi-persistent scheduling radio network identifier.

In certain embodiments, a method includes determining a first semi-persistent scheduling resource assignment indicating a first set of resources, the first set of resources including a first multiple time domain resources. In such embodiments, each time domain resource of the first multiple time domain resources has a first transmission time interval length. The method also includes determining a second semi-persistent scheduling resource assignment indicating a second set of resources, the second set of resources including a second multiple time domain resources. In such embodiments, each time domain resource of the second multiple time domain resources has a second transmission time interval length, and the first transmission time interval length is different from the second transmission time interval length. The method includes transmitting the first semi-persistent scheduling resource assignment using a first semi-persistent scheduling radio network identifier. The method also includes transmitting the second semi-persistent scheduling resource assignment using a second semi-persistent scheduling radio network identifier.

In certain embodiments, the first semi-persistent scheduling radio network identifier and the second semi-persistent scheduling radio network identifier are the same. In some embodiments, the first semi-persistent scheduling radio network identifier and the second semi-persistent scheduling radio network identifier are different. In various embodiments, the first and second semi-persistent scheduling resource assignments are for uplink transmissions. In one embodiment, the first and second semi-persistent scheduling resource assignments are for downlink transmissions. In certain embodiments, the method includes determining a location of the first semi-persistent scheduling resource assignment based on a first number of symbols and determining a location of the second semi-persistent scheduling resource assignment based on a second number of symbols. In some embodiments, the method includes transmitting information indicating a location in a subframe for one or more of semi-persistent scheduling activation and semi-persistent scheduling deactivation commands. In various embodiments, the method includes transmitting information indicating one or more of semi-persistent scheduling activation and semi-persistent scheduling deactivation commands in a predetermined location in a subframe.

Another apparatus includes a receiver that receives a first semi-persistent scheduling resource assignment indicating a first set of resources, the first set of resources including a first multiple time domain resources. In such embodiments, each time domain resource of the first multiple time domain resources has a first transmission time interval length. The receiver also receives a second semi-persistent scheduling resource assignment indicating a second set of resources, the second set of resources including a second multiple time domain resources. In such embodiments, each time domain resource of the second multiple time domain resources has a second transmission time interval length, and the first transmission time interval length is different from the second transmission time interval length. The apparatus includes a processor that determines the first semi-persistent scheduling resource assignment using a first semi-persistent scheduling radio network identifier, and determines the second semi-persistent scheduling resource assignment using a second semi-persistent scheduling radio network identifier.

Another method includes receiving a first semi-persistent scheduling resource assignment indicating a first set of resources, the first set of resources including a first multiple time domain resources. In such embodiments, each time domain resource of the first multiple time domain resources has a first transmission time interval length. The method includes receiving a second semi-persistent scheduling resource assignment indicating a second set of resources, the second set of resources including a second multiple time domain resources. In such embodiments, each time domain resource of the second multiple time domain resources has a second transmission time interval length, and the first transmission time interval length is different from the second transmission time interval length. The method also includes determining the first resource assignment using a first semi-persistent scheduling radio network identifier. The method includes determining the second resource assignment using a second semi-persistent scheduling radio network identifier.

In one embodiment, the first semi-persistent scheduling resource assignment is for uplink transmissions, and the method further includes receiving a deactivation command, determining at least one time domain resource of the first multiple time domain resources, and, in response to receiving the deactivation command, deactivating semi-persistent scheduling related data transmission on the at least one time domain resource of the first multiple time domain resources.

In some embodiments, the deactivation command is a first deactivation command, and the method further includes receiving a second deactivation command, and, in response to receiving the second deactivation command, deactivating semi-persistent scheduling related data transmission until reception of a semi-persistent scheduling activation command or a semi-persistent scheduling reactivation command. In various embodiments, the first transmission time interval length corresponds to a first number of symbols, and the second transmission time interval length corresponds to a second number of symbols.

A further method includes receiving a first semi-persistent scheduling resource assignment indicating a first set of periodic time domain resources. In such embodiments, each resource of the first set of periodic time domain resources has a first transmission time interval length. The method also includes determining a first resource of the first set of periodic time domain resources that overlaps with a resource used for transmissions based on a second transmission time interval length. The method includes determining a second resource of the first transmission time interval length that does not overlap with the resource used for transmissions based on the second transmission time interval length. The method also includes using the second resource for semi-persistent scheduling related data transmissions and not using the first resource for semi-persistent scheduling related data transmissions. In such embodiments, the first transmission time interval length and the second transmission time interval length are different.

In one embodiment, the method includes receiving a message indicating the resources used for transmissions based on the second transmission time interval length. In some embodiments, the first transmission time interval length corresponds to a shortened transmission time interval length, and the second transmission time interval length corresponds to a legacy transmission time interval length, and the shortened transmission time interval length is smaller than the legacy transmission time interval length. In various embodiments, the method includes determining the second resource from the first set of periodic time domain resources.

In certain embodiments, the method includes determining the second resource from a third set of time domain resources not overlapping with the first set of periodic time domain resources. In one embodiment, the method includes determining the second resource based on time domain information of the first resource and the time domain information of the resource used for transmissions based on the second transmission time interval length. In some embodiments, the first semi-persistent scheduling resource assignment includes a bit-map pattern. In various embodiments, a periodicity of the first set of time domain resources is defined based on a number of transmission time intervals. In certain embodiments, the method includes receiving an indication that indicates a third transmission time interval length for the first semi-persistent scheduling resource assignment, and determining the periodicity of the first time domain resources based on the third transmission time interval length. In such embodiments, the first transmission time interval length and the third transmission time interval length are different.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
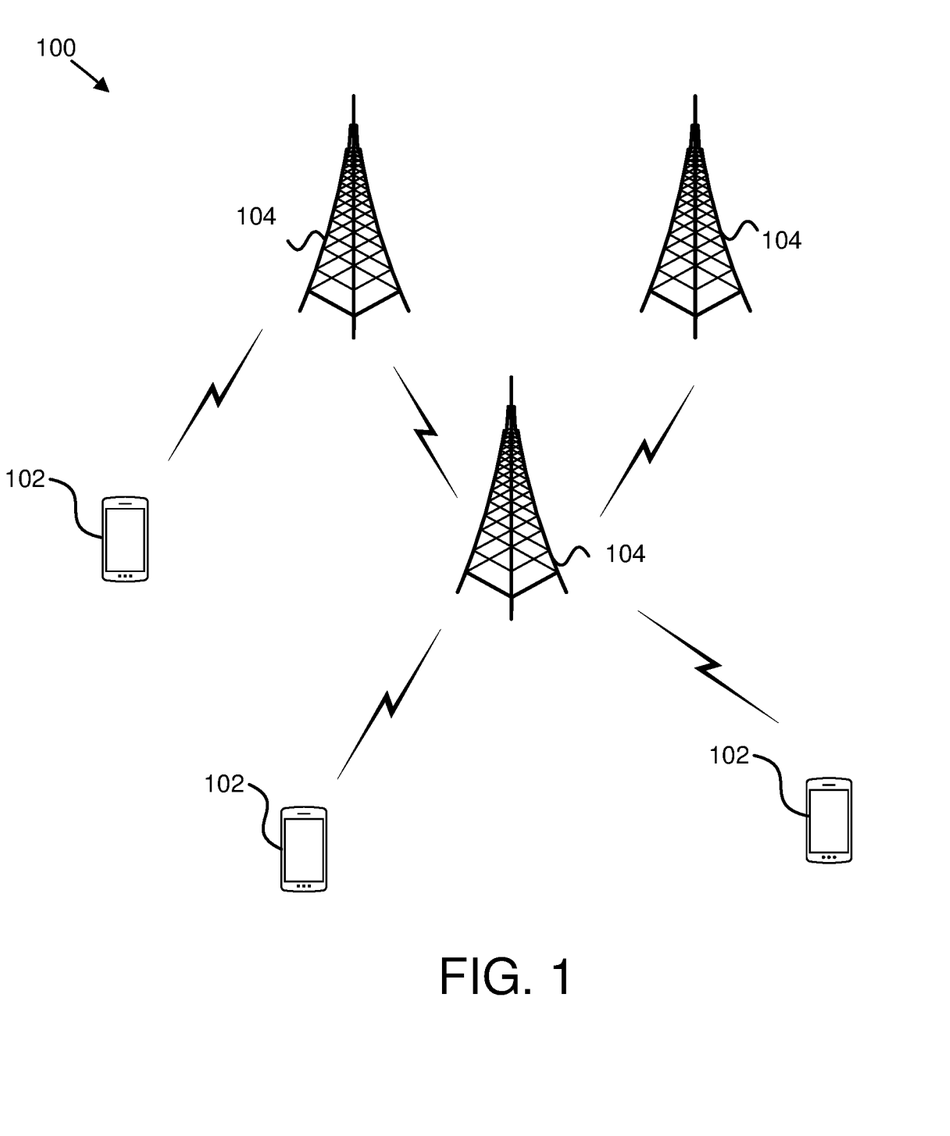
FIG. 1 is a schematic block diagram illustrating one embodiment of a wireless communication system for scheduling of transmission time intervals ("TTIs")

FIG. 1 depicts an embodiment of a wireless communication system 100 for scheduling of transmission time intervals ("TTIs"). In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), low throughput devices, low delay sensitivity devices, ultra-low cost devices, low power consumption devices, an IoT device, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an evolved node B ("eNB"), a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to a mobility management entity ("MIME"), a serving gateway ("SGW"), and/or a packet data network ("PDN") gateway ("PGW").

In one implementation, the wireless communication system 100 is compliant with the LTE of the 3GPP protocol, wherein the base unit 104 transmits using an OFDM modulation scheme on the DL and the remote units 102 transmit on the uplink ("UL") using a single carrier frequency-division multiple access ("SC-FDMA") scheme. In another implementation, the wireless communication system 100 is compliant with narrowband internet-of-things ("NB-IoT"). More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., base unit 104) may determine a first semi-persistent scheduling ("SPS") radio network identifier ("RNI") for a first resource assignment associated with a first transmission time interval ("TTI") including a first number of symbols. RNI can include network temporary identifier ("RNTI"). The apparatus may also determine a second SPS RNI for a second resource assignment associated with a second TTI including a second number of symbols different from the first number of symbols. The apparatus may transmit information indicating the first resource assignment using the first SPS RNI, and information indicating the second resource assignment using the second SPS RNI. Therefore, SPS may be assigned for multiple TTIs of different size.

In a further embodiment, an apparatus (e.g., remote unit 102) may receive information indicating a first resource assignment associated with a first TTI including a first number of symbols. The apparatus may also receive information indicating a second resource assignment associated with a second TTI comprising a second number of symbols different from the first number of symbols. The apparatus may determine the first resource assignment using a first SPS RNI. The apparatus may also determine the second resource assignment using a second SPS RNI. In another embodiment, the apparatus may determine the association of the resource assignment with the TTI length based on a location of resource assignment. For example, a resource assignment received in a first location or region in a subframe may be associated with a first TTI, and a resource assignment received in a second location or region in a subframe may be associated with a second TTI. The first and second location or region may be non-overlapping, and the first and second resource assignment may use the same SPS RNI.

Figure 2:
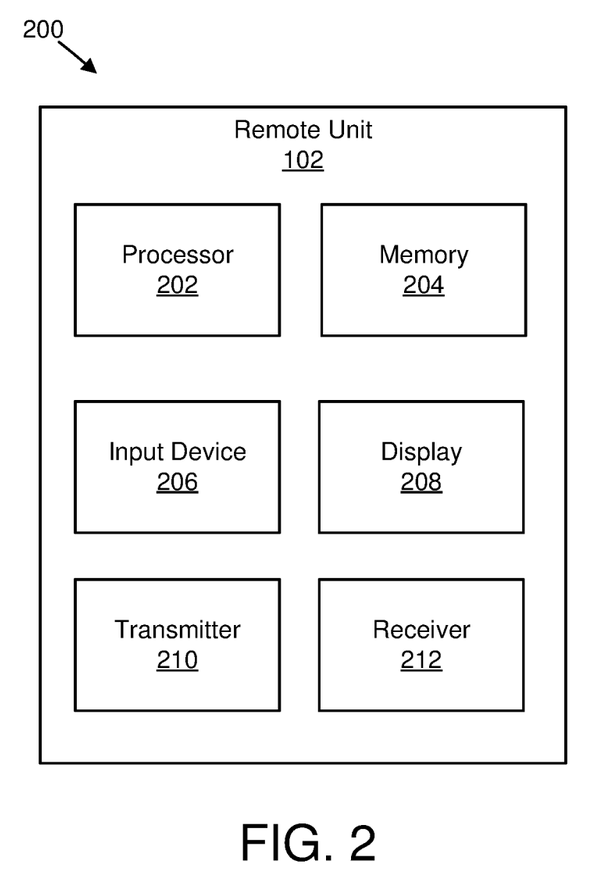
FIG. 2 is a schematic block diagram illustrating one embodiment of an apparatus that may be used for scheduling of TTIs.

FIG. 2 depicts one embodiment of an apparatus 200 that may be used for scheduling of TTIs. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine the first resource assignment using a first SPS RNI, and determine the second resource assignment using a second SPS RNI.

The memory 204, in one embodiment, is a computer readable storage medium. In some embodiments, the memory 204 includes volatile computer storage media. For example, the memory 204 may include a random access memory ("RAM"), including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive information indicating a first resource assignment associated with a first TTI including a first number of symbols. In some embodiments, the receiver 212 is used to receive information indicating a second resource assignment associated with a second TTI comprising a second number of symbols different from the first number of symbols. In one embodiment, the transmitter 210 is used to transmit feedback information and/or an indication to the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
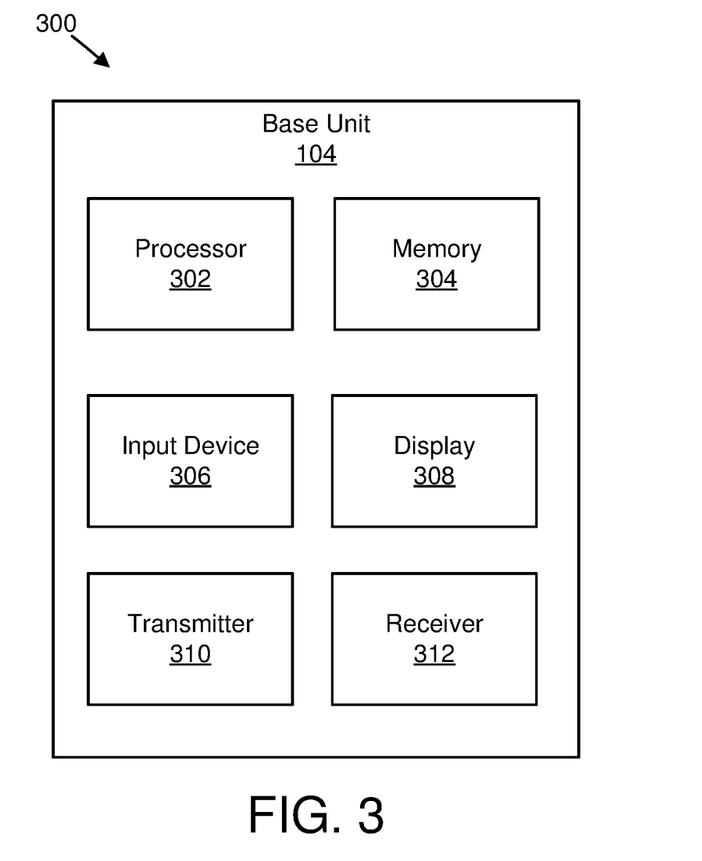
FIG. 3 is a schematic block diagram illustrating one embodiment of an apparatus that may be used for scheduling of TTIs.

FIG. 3 depicts one embodiment of an apparatus 300 that may be used for scheduling of TTIs. The apparatus 300 includes one embodiment of the base unit 104. Furthermore, the base unit 104 may include a processor 302, a memory 304, an input device 306, a display 308, a transmitter 310, and a receiver 312. It should be noted that the processor 302, the memory 304, the input device 306, and the display 308 may be substantially similar to the processor 202, the memory 204, the input device 206, and the display 208 of the remote unit 102, respectively. In certain embodiments, the processor 302 may be used to determine a first SPS RNI for a first resource assignment associated with a first TTI including a first number of symbols. In some embodiments, the processor 302 may be used to determine a second SPS RNI for a second resource assignment associated with a second TTI comprising a second number of symbols different from the first number of symbols.

The transmitter 310 is used to provide DL communication signals to the remote unit 102 and the receiver 312 is used to receive UL communication signals from the remote unit 102. In certain embodiments, the transmitter 310 is used to transmit information indicating the first resource assignment using the first SPS RNI, and to transmit information indicating the second resource assignment using the second SPS RNI. It should be noted that, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
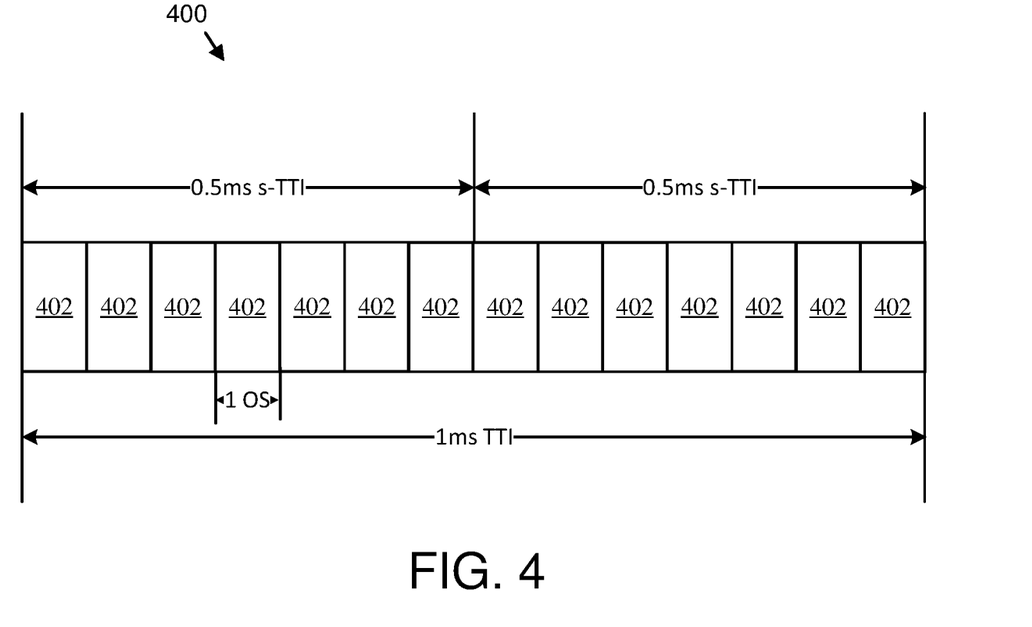
FIG. 4 illustrates one embodiment of s-TTIs.
Figure 5:
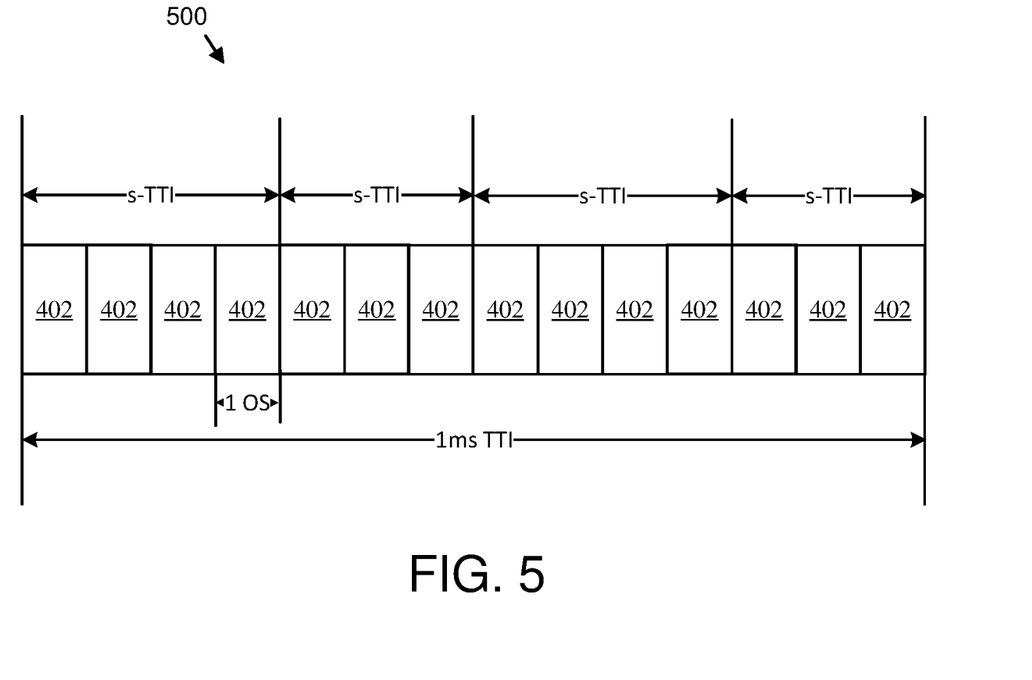
FIG. 5 illustrates another embodiment of s-TTIs.

FIG. 4 illustrates one embodiment of s-TTIs 400 using a normal cyclic prefix as an example. In the illustrated embodiment, each s-TTI is half the length of a standard size TTI of 1 ms. Accordingly, each s-TTI is 0.5 ms. As illustrated, each s-TTI includes seven OFDM symbols 402. FIG. 5 illustrates another embodiment of s-TTIs 500, again using a normal cyclic prefix as an example. In this embodiment, some s-TTIs include four OFDM symbols 402, and some s-TTIs include three OFDM symbols 402. It should be noted that an s-TTI may include any number of OFDM symbols 402 that is less than a standard size TTI. In this disclosure, a UE that is configured to use s-TTI may be referred to as an s-UE (e.g., remote unit 102), while a UE not configured to use s-TTI may be referred to as a legacy UE. In certain embodiments, the subcarrier spacing and the cyclic prefix length may be common to both legacy UEs and s-UEs.

In certain configurations, dynamic scheduling may be good for bursting infrequent and bandwidth consuming data transmissions (e.g. web surfing, video streaming, emails). However, dynamic scheduling may be less suitable for real time streaming. Semi-persistent scheduling ("SPS") is a transmission method that defines a transmission pattern instead of scheduling a single uplink or downlink transmission. In certain embodiments, SPS may reduce scheduling assignment overhead, and may enable data communication with lower latency as there is no need to obtain/generate scheduling assignment information for a single transmission. SPS operation combined with s-TTI may reduce scheduling assignment overhead. It should be noted that remote unit 102 transmissions may be either received by one or more base stations or other remote units 102 in a communication network.

In certain LTE systems, a base unit 104 may configure and/or reconfigure a remote unit 102 with SPS at any time by radio resource control ("RRC") using an SPS configuration ("SPS-Config"). The SPS-Config may include the configuration for an SPS cell radio network temporary identifier ("C-RNTI") ("SPS-C-RNTI), SPS downlink configuration ("SPS-ConfigDL"), and/or SPS uplink configuration ("SPS-ConfigUL"). When configuring SPS in any direction either UL or DL, SPS C-RNTI may be provided by the base unit 104. After a remote unit 102 is configured with SPS C-RNTI, the remote unit 102 may be configured by higher layers to decode physical downlink control channel ("PDCCH") with cyclic redundancy code ("CRC") scrambled by the SPS C-RNTI. A remote unit 102 may monitor PDCCH with CRC scrambled by the SPS C-RNTI in every subframe as the base unit 104 may activate, reactivate, and/or release SPS at any time using downlink control information ("DCI").

When s-TTI is enabled in a system, a remote unit 102 may be configured to use different TTI lengths for different packet types (e.g., 1 ms TTI may be used for voice packets, 0.5 ms TTI length may be used for a packet with low-latency requirements, and 2 symbol TTI length may be used for a packet with super low-latency requirements). Therefore, a remote unit 102 may be configured with more than one SPS configuration, and each SPS configuration may have a different TTI length (e.g., an SPS configuration for voice using 1 ms TTI, another SPS configuration for s-TTI=2 symbols, and another SPS configuration for s-TTI=0.5 ms).

In certain embodiments, to enable multiple SPS configurations with different TTI lengths, multiple approaches may be used for both UL and DL.

For example, in one embodiment, each SPS configuration for a remote unit 102 corresponds to a different TTI length and has its own corresponding SPS-C-RNTI. The remote unit 102 may receive the SPS configurations via dedicated RRC signaling for each TTI length the remote unit 102 is configured to use. Each SPS configuration RRC signal contains its own SPS-C-RNTI. The base unit 104 may scramble PDCCH (e.g., enhanced PDCCH ("EPDCCH")) corresponding to the TTI length with CRC scrambled by the SPS-C-RNTI associated with the SPS configuration of that TTI length, such as in every s-TTI in which the control information is monitored. The remote unit 102 may monitor the PDCCH with CRC scrambled by the SPS-C-RNTI in every s-TTI in which the control information is monitored.

As another example, in certain embodiments, all SPS configurations for the remote unit 102 may use the same SPS-C-RNTI. The remote unit 102 may receive the SPS configurations via dedicated RRC signaling for each TTI length the remote unit 102 is configured to use. Each SPS configuration RRC signal contain the same SPS-C-RNTI. The base unit 104 may scrambles PDCCH corresponding to the TTI length with CRC scrambled by the same SPS-C-RNTI in every s-TTI in which the control information is monitored. In certain embodiments, control information regarding the s-TTI operation may be transmitted in 2 parts for SPS for s-TTI. In such embodiments, one part or both parts may be scrambled with SPS-C-RNTI. For example, 2 part transmission may include transmissions for activation, release, validation, and so forth. The remote unit 102 may monitor the PDCCH with CRC scrambled by the SPS-C-RNTI in every s-TTI in which the control information is monitored.

In some embodiments, such as when all SPS configurations use the same SPS-C-RNTI, the remote unit 102 may need to distinguish which control commands are for which SPS configuration. Certain control commands may be sent for activation and/or release of SPS, or for changing a frequency resource allocation of the SPS. For example, if a remote unit 102 is configured for two SPS operations: one with TTI length of 1 ms and the other one with TTI length of 2 symbol, upon reception of a PDCCH scrambled with SPS-C-RNTI, the remote unit 102 may need to figure out if this PDCCH command is for SPS with TTI length of 1 ms or for SPS with TTI length of 2-symbols.

In one embodiment, the remote unit 102 may deduce which SPS configuration the control command is directed to by the location of the received control command. For example, if the TTI that the PDCCH command is received in is OFDM symbol 4, the command may not be for the 1 ms TTI, but may be for an s-TTI that starts with symbol 4. In some embodiments, a time-frequency position of the PDCCH commands may be used to indicate which SPS configuration the control command is directed to. In such embodiments, the remote unit 102 may receive an indication of such time-frequency positions that may be used. In some embodiments, the remote unit may determine the association of the SPS configuration with the TTI length based on a location of PDCCH control message. For example, a control message received in a first location or region in a subframe may be associated with a SPS configuration of a first TTI, and a control message received in a second location or region in a subframe may be associated with a SPS configuration of a second TTI. The first and second location or region may be non-overlapping.

In another embodiment, the control command may have a new field indicating the length of TTI to which an SPS configuration corresponds. In some embodiments, the field may use a predetermined combination of other fields in the control command to indicate the length of TTI to which an SPS configuration corresponds.

In certain configurations, such as when multiple SPS configurations use a single SPS-C-RNTI, SPS reconfiguration may be avoided and/or reduced if an s-TTI length changes. In one embodiment, RRC reconfiguration may be avoided and/or reduced in the event of an s-TTI length change (e.g., from 2 symbol TTI to 0.5 ms TTI). For example, if a remote unit 102 is configured with an SPS corresponding to a 2 symbol TTI and the s-TTI length is changed to 0.5 ms, RRC reconfiguration may be avoided and/or reduced if the SPS configuration is a function of TTI length, and only the TTI length changes in the SPS formula. For example, if SPS-Interval=10 TTI has been used for the remote unit 102 when configured with s-TTI=2 symbols (i.e., SPS-Interval=20 symbols), in the event of s-TTI length change to 0.5 ms, the SPS-Interval=10 TTI, but now equals 5 ms.

In some embodiments, a control command and/or a higher layer command (e.g., medium access control ("MAC") control element ("CE") ("MAC-CE") or an RRC command) indicates to the remote unit 102 that the TTI length is changed. For example, an SPS activation and/or SPS reactivation command may be sent. In various embodiments, an SPS release control command may be sent and then again an SPS activation command may be sent once the remote unit 102 is indicated that the TTI length is changed.

In one embodiment, a network and/or a base unit 104 may inform a remote unit 102 which control commands are for which SPS configuration when different SPS configurations correspond to different TTI lengths.

In certain embodiments, a network and/or a base unit 104 may indicate a first SPS radio network identifier ("RNI") of a first resource assignment via a first set of higher layer configured SPS parameters associated with a first TTI length of a first SPS transmission set. In such embodiments, a higher layer may be higher than a physical layer, the first transmission set spans the first TTI length, and the first TTI length includes a first number of symbols.

The network and/or the base unit 104, in some embodiments, may indicate a second SPS RNI of a second resource assignment via a second set of higher layer configured SPS parameters associated with a second TTI length of a second SPS transmission set. In such embodiments, a higher layer is higher than a physical layer, the second transmission set spans the second TTI length, the second TTI length includes a second number of symbols, and the second number is different from the first number. In various embodiments, the network and/or base unit 104 may transmit the first resource assignment using the first SPS RNI, and transmit the second resource assignment using the second SPS RNI.

In one embodiment, CRC bits of each resource assignment are scrambled by a sequence initialized with the corresponding RNI. In some embodiments, the first SPS RNI and the second SPS RNI are the same. In other embodiments, the first SPS RNI and the second SPS RNI are not the same. In various embodiments, the first and the second resource assignments are for UL transmissions. In certain embodiments, the first and the second resource assignments are for DL transmissions. In one embodiment, the network and/or the base unit 104 determines the location of the SPS resource assignment based on the TTI length. In some embodiments, the network and/or the base unit 104 signals to a device a set of possible time and/or frequency locations to be used for signaling of the SPS resource assignment for the first and second TTI lengths. For example, frequency position of the PDCCH commands may be different and the remote unit 102 may be signaled such frequency positions.

In some embodiments, activation and/or release commands for SPS resources may use a resource assignment command for indication to the remote unit 102. The remote unit 102 may validate the activation and/or release command.

In certain embodiments, configuration of SPS may not enable a remote unit 102 to start using SPS grants and/or assignments. For example, the base unit 104 may explicitly activate SPS to enable the remote unit 102 to use SPS grants and/or assignments.

In situations in which an SPS is activated by mistake, a remote unit 102 may use the recurring resource for a long period of time, which may introduce interference to normal data transmissions. Accordingly, activation of the SPS may be performed using various methods to block activation of an SPS by mistake. In some embodiments, a base unit 104 may explicitly release SPS without releasing an SPS RRC configuration.

In one example, a remote unit 102 may be configured with two SPS configurations: one with 1 ms TTI and one with 2-symbol TTI. In this example, none of the SPS configurations is activated for the remote unit 102. If the network and/or the base unit 104 is to activate the second SPS (i.e., the SPS with TTI=2-symbols) for the remote unit 102, the network and/or the base unit 104 sends a control command to the remote unit 102. In embodiments in which the same SPS-C-RNTI for SPS configurations with different TTI lengths for a remote unit 102 is used, to avoid activating the wrong SPS (i.e., the SPS with 1 ms TTI length) mistakenly, an SPS assignment validation procedure as described in FIG. 6 may be used.

Figure 6:
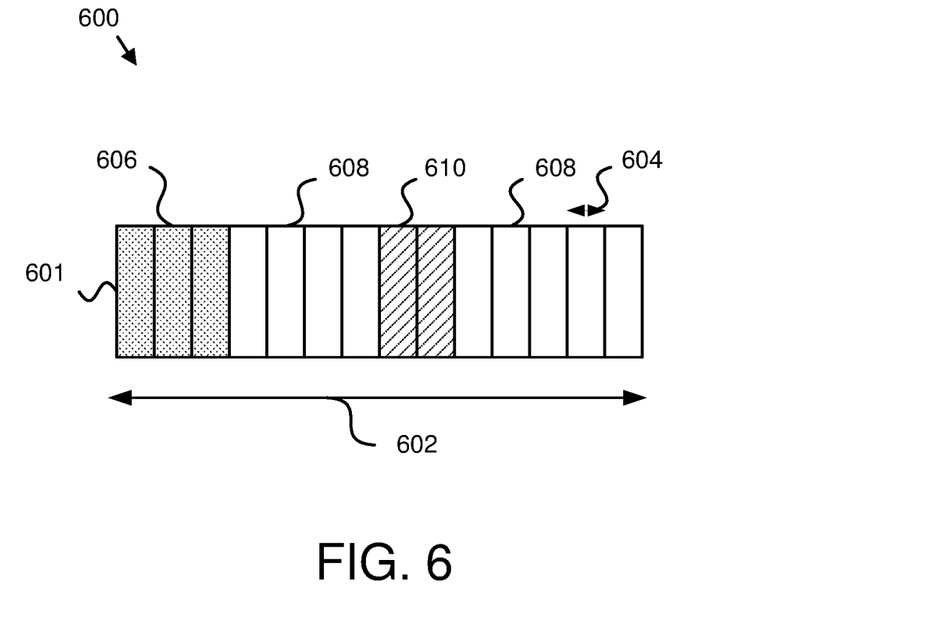
FIG. 6 illustrates one embodiment of TTI scheduling.

FIG. 6 illustrates one embodiment of TTI scheduling 600. One subframe 601 has a length 602 of 1 ms. The subframe 601 includes 14 symbols that each have a length 604 of 1/14 ms. SPS assignment validation procedure for SPS configuration corresponding to an s-TTI length may include that SPS activation and/or release commands may occur only during a certain s-TTI index (referred to herein as "s_indx") inside a 1 ms subframe. For example, the s_indx may be chosen such that SPS commands for 1 ms and 2 symbol TTI length may not occur at in the same symbols: in other words, s_indx is chosen to be larger than 1 when an s-TTI inside a subframe starts with 1. Other variants may be possible (e.g., choosing s_indx such that it avoids with all configured SPSs with a TTI length other than that of the one with s_indx). In the illustrated embodiment, a first s-indx 606 may correspond to possible locations for SPS activation and/or deactivation for a 1 ms TTI (e.g., any combination of the 3 symbols of the first s-indx 606 may be used for SPS activation and/or deactivation for the 1 ms TTI), a second s-indx 608 may correspond to possible locations for SPS activation and/or deactivation for a 2 symbol TTI (e.g., any combination of the 9 symbols of the second s-indx 608 may be used for SPS activation and/or deactivation for the 2 symbol TTI), and a third s-indx 610 may correspond to possible locations for SPS activation and/or deactivation for 0.5 ms TTI (e.g., any combination of the 2 symbols of the third s-indx 610 may be used for SPS activation and/or deactivation for the 0.5 ms TTI). In some embodiments, s_indx may be fixed in a specification for each TTI length or may be indicated to the remote unit 102 via higher layer signaling.

Figure 7:
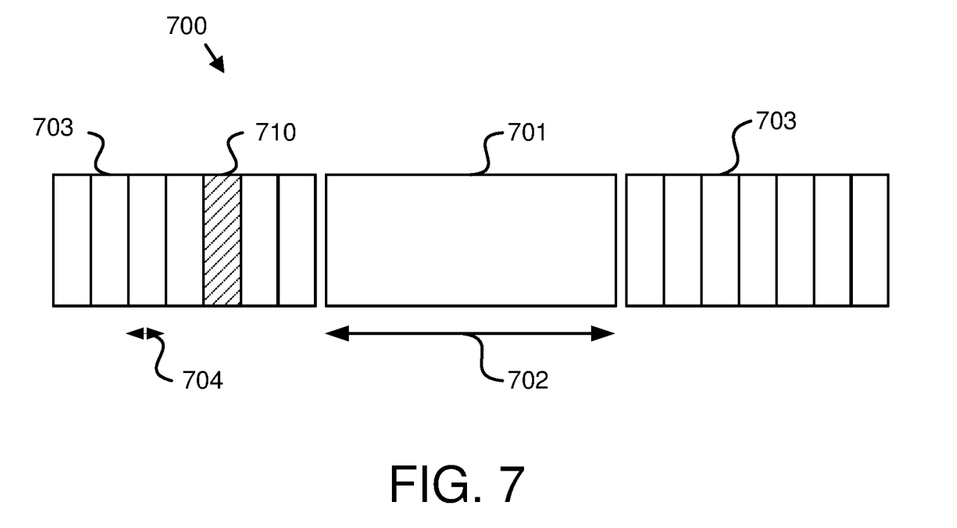
FIG. 7 illustrates another embodiment of TTI scheduling.

FIG. 7 illustrates another embodiment of TTI scheduling 700. Specifically, FIG. 7 illustrates one embodiment of an occasion of SPS in which an s-TTI occurs in a subframe not allowing s-TTI operation. One subframe 701 has a length 702 of 1 ms. Two other subframes 703 of length 1 ms include 7 divisions that each have a length 704 of ⅐ ms.

Certain embodiments may enable reduced latency operation and may set aside some subframes (e.g., subframe 701) for legacy TTI operation (e.g., a legacy-only subframe). In such embodiments, no s-TTI operation may be performed in those subframes. As SPS resources may occur periodically, it is possible that an SPS for s-TTI operation may coincides with a legacy-only subframe.

In one embodiment, a base unit 104 may send a PDCCH control command to release the SPS momentarily, and when there is no longer such coincidence, the base unit 104 may send a control command to reactivate the SPS.

In another embodiment, a base unit 104 may perform "Opportunistic muting" of preconfigured SPS resources. For example, the base unit 104 may send two different types of deactivation commands: a first deactivation command that is a temporary command 710 that applies to only one subframe (i.e., deactivates SPS occasions in a single 1 ms subframe) and a second deactivation command that is a regular command that deactivates until the next activation and/or reactivation command. As illustrated in FIG. 7, subframes 703 may include SPS for a TTI that is deactivated by the temporary command 710 to skip the subframe 701 and then resume after the subframe 701. The system may operate with only a single TTI length, e.g., legacy TTI operation or s-TTI operation or both legacy TTI and sTTI operation.

In certain embodiments, two types of deactivation commands may be distinguished based on at least a field in the command set to different values for the two commands. In some embodiments, the two types of deactivation commands may be distinguished based on a location in which they are sent. For example, if the command is sent in one time-frequency region it means the command is a first type deactivation command, and if the command is sent in another time-frequency region it means the command is a second type deactivation command.

In some embodiments, the temporary command 710 may be sent prior to the subframe 701 in which SPS transmissions are not allowed. The time position (with respect to the subframe in which s-TTI operation is not allowed) of such a command may be specified in the specification. For example, the command may not be sent less than four s-TTIs before the start of the legacy-only subframe 701.

Figure 8:
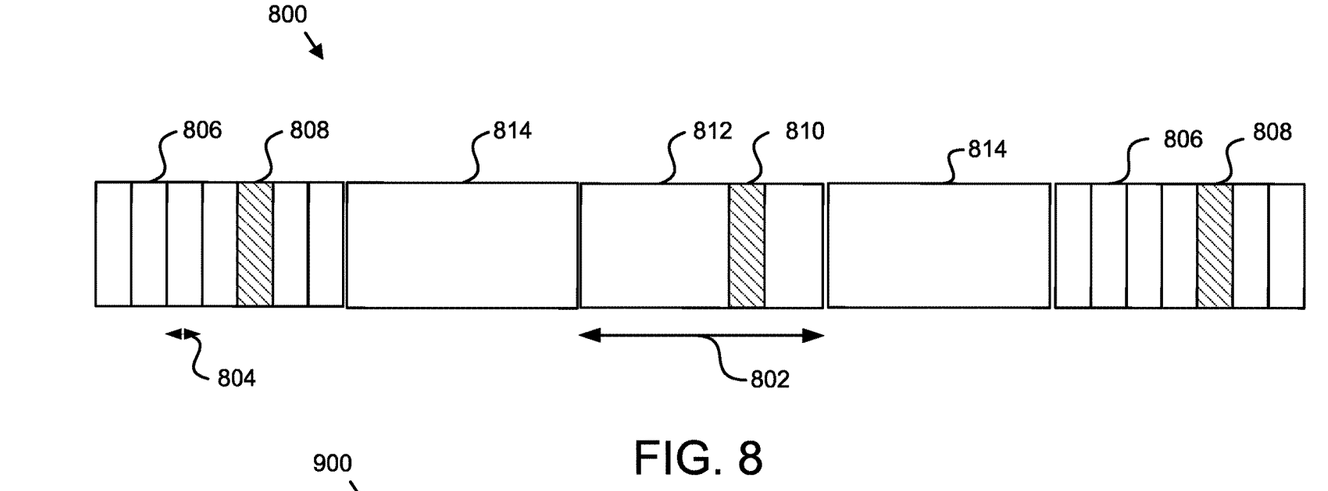
FIG. 8 illustrates a further embodiment of TTI scheduling.

FIG. 8 illustrates a further embodiment of TTI scheduling 800. Specifically, FIG. 8 illustrates another embodiment of an occasion of SPS in which an s-TTI occurs in a subframe not allowing s-TTI operation. Each subframe has a length 802 of 1 ms. Subframes that include valid scheduled SPS occurrences may include 7 divisions that each have a length 804 of ⅐ ms. Specifically, subframes 806 include valid scheduled SPS occurrences 808. An SPS occurrence 810 is scheduled during a subframe 812 that is a legacy-only subframe, in which the SPS occurrence 810 is not allowed. Subframes 814 in the illustrated embodiment allow SPS occurrences, but do not include any scheduled SPS occurrences.

Certain embodiments may facilitate "Rule-based SPS occasions." In rule-based SPS occasions, the remote unit 102 may skip the SPS occurrence 810 in the legacy-only subframe 812. The next SPS occasion may by determined by an SPS formula and/or bit-map in a specification. For example, as illustrated, the next SPS occasion may be the normally scheduled SPS occurrence 808 that follows the skipped SPS occurrence 810.

Figure 9:
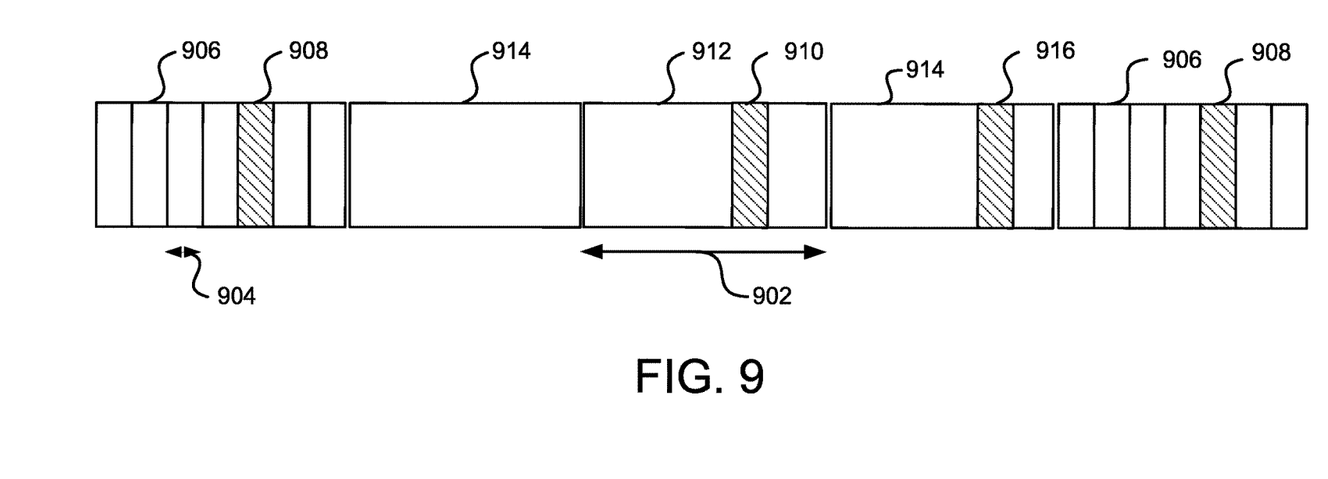
FIG. 9 illustrates yet another embodiment of TTI scheduling.

FIG. 9 illustrates yet another embodiment of TTI scheduling 900. Specifically, FIG. 9 illustrates yet another embodiment of an occasion of SPS in which an s-TTI occurs in a subframe not allowing s-TTI operation. Each subframe has a length 902 of 1 ms. Subframes that include valid scheduled SPS occurrences may include 7 divisions that each have a length 904 of ⅐ ms. Specifically, subframes 906 include valid scheduled SPS occurrences 908. An SPS occurrence 910 is scheduled during a subframe 912 that is a legacy-only subframe, in which the SPS occurrence 910 is not allowed. Subframes 914 in the illustrated embodiment allow SPS occurrences, but do not include any scheduled SPS occurrences.

In various embodiments, an occasion which does not belong to the SPS occasion set (i.e., SPS formula and/or bit-map), may be used as a replacement SPS occasion for an SPS occasion that interferes with a legacy-only subframe. Such a replacement SPS occasion may be a deterministic function of the SPS configuration and the skipped SPS occasion. For example, the replacement SPS occasion may be a first s-TTI location outside of the legacy-only subframe. As another example, the replacement SPS occasion may use the same s-TTI index as the skipped s-TTI in the next subframe that allows both legacy and s-TTI operation (e.g., replacement SPS occurrence 916 that is used because SPS occurrence 910 is skipped).

In certain embodiments, to reduce control overhead and also remote unit 102 processing for PDCCH, the SPS-C-RNTI for reduced latency operation may be only processed at certain s-TTIs (e.g., first occasion in a subframe coinciding with 1 ms TTI PDCCH control region in the time domain).

In one embodiment, when an SPS resource (occasion) of a s-TTI for a device occurs at a subframe where s-TTI operation is not allowed (SPS resources are periodic and hence such occurrences are possible), the network and/or the base unit 104 may inform the device to not use that SPS resource and/or occasion.

In some embodiments, a method may include indicating a first indication to a device, the first indication corresponding to a SPS resource assignment determining a first set of resources to be used for a first set of transmissions using a first TTI. The method, in various embodiments, may include indicating a second indication to the device, the second indication corresponding to a second set of resources for a second transmission using a second TTI. In such embodiments, a subset of the transmissions of the first set may overlap with the second transmission in time. The method, in one embodiment, may include indicating a third indication to the device, to not use (e.g., ignore, drop) the subset of the transmissions of the first set.

In one embodiment, the first set of transmissions are for s-TTI and/or reduced latency, and the second transmission using the second TTI is a regular 1 ms subframe transmission. In certain embodiments, the subset of the transmissions of the first set corresponds to transmissions belonging to a single subframe. In one embodiment, the third indication is a physical layer indication. In various embodiments, the first set of transmissions and the second transmission are UL transmissions, and the third indication is a higher layer indication. In various embodiments, the first set of transmissions and the second transmission are UL transmissions and the third indication is an implicit indication that drops the subset of the transmissions of the first set. In one embodiment, the first TTI length is 1 ms.

In some embodiments, there may be legacy SPS collisions with s-TTI. In certain LTE systems, dynamic scheduling of best effort data may occur on top of SPS, but the SPS allocations may take precedence over scheduling conflicts.

However, if a remote unit 102 is configured with a SPS corresponding to 1 ms TTI in UL, and a dynamic grant for an s-TTI with colliding time and/or time-frequency resources with the SPS resources is received by the remote unit 102, the remote unit 102 may prioritize the low-latency data transmission if it is configured via higher layers to drop the 1 ms SPS transmission; otherwise, the 1 ms SPS transmission may be prioritized. In one embodiment, in case of resource conflicts, the priority rule may be fixed in the specification, for example, SPS prioritized over dynamic scheduling; s-TTI operation prioritized over legacy TTI operation for given scheduling type (dynamic or SPS); SPS using legacy TTI prioritized over dynamic scheduling using s-TTI; and/or SPS using s-TTI prioritized over dynamic scheduling using legacy TTI.

In one embodiment, a device, such as in UL, may prioritize one transmission over the second transmission (one of the transmissions is a transmission corresponding to SPS operation).

In certain embodiments, one method at the device may include transmitting a first transmission in UL using a first TTI in a first resource, and dropping (e.g., not transmitting) a second UL transmission using a second TTI corresponding to a second SPS resource for a third period in time. In such embodiments, the first and the second resource may overlap in time in the third period. In various embodiments, the device may be configured via higher layers to drop the second UL transmission.

In some embodiments, SPS may have a non-periodic pattern. For example, SPS occasions may follow a pattern that is non-periodic (e.g., a bit-map pattern) which is indicated to the device, such as by higher layer signaling (e.g., RRC signaling). In one embodiment, an SPS pattern may be a bit-map pattern indicated by higher layer signaling. In some embodiments, SPS occasions are indicated by a bit-map to a device via higher layer signaling. In another embodiment, an indication may include a first periodicity for a first time duration, and a second periodicity for a second duration, e.g., after the end of the first time duration. The first periodicity may be smaller than the second periodicity.

Figure 10:
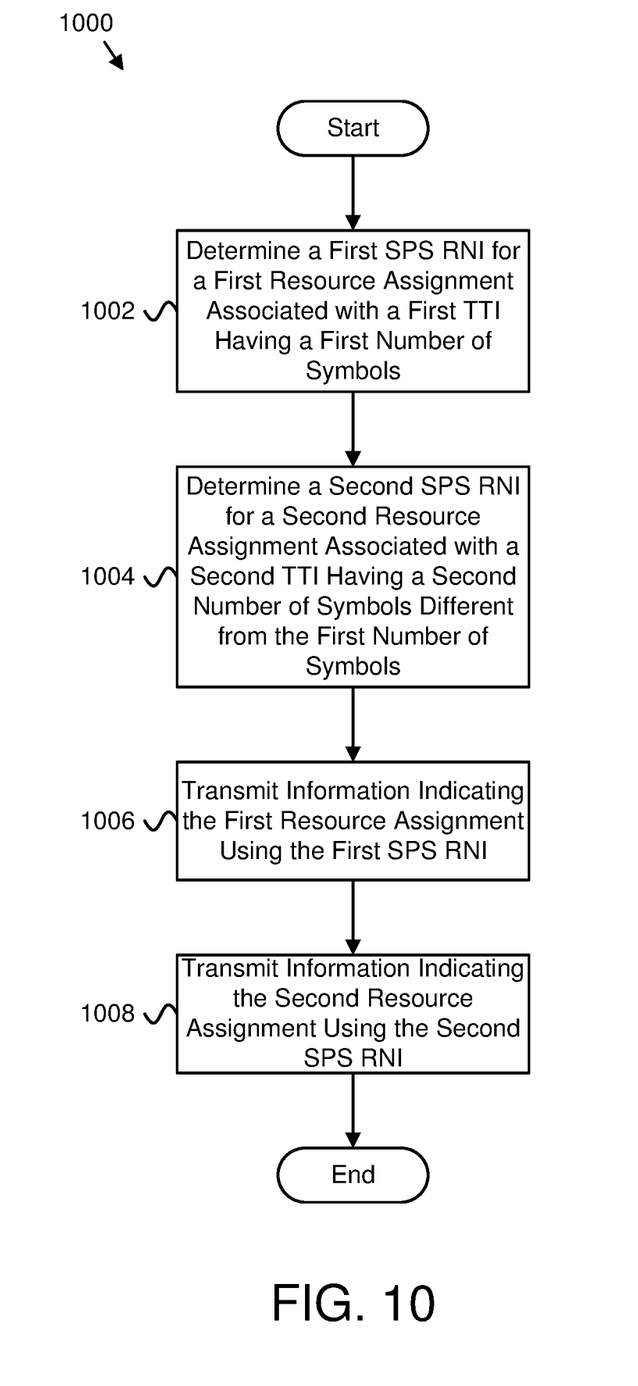
FIG. 10 is a schematic flow chart diagram illustrating one embodiment of a method for scheduling of TTIs.

FIG. 10 is a schematic flow chart diagram illustrating one embodiment of a method 1000 for scheduling of TTIs. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 a first SPS RNI for a first resource assignment associated with a first TTI including a first number of symbols. The method 1000 may also include determining 1004 a second SPS RNI for a second resource assignment associated with a second TTI including a second number of symbols different from the first number of symbols. The method 1000 may include transmitting 1006 information indicating the first resource assignment using the first SPS RNI. The method 1000 may include transmitting 1008 information indicating the second resource assignment using the second SPS RNI.

Figure 11:
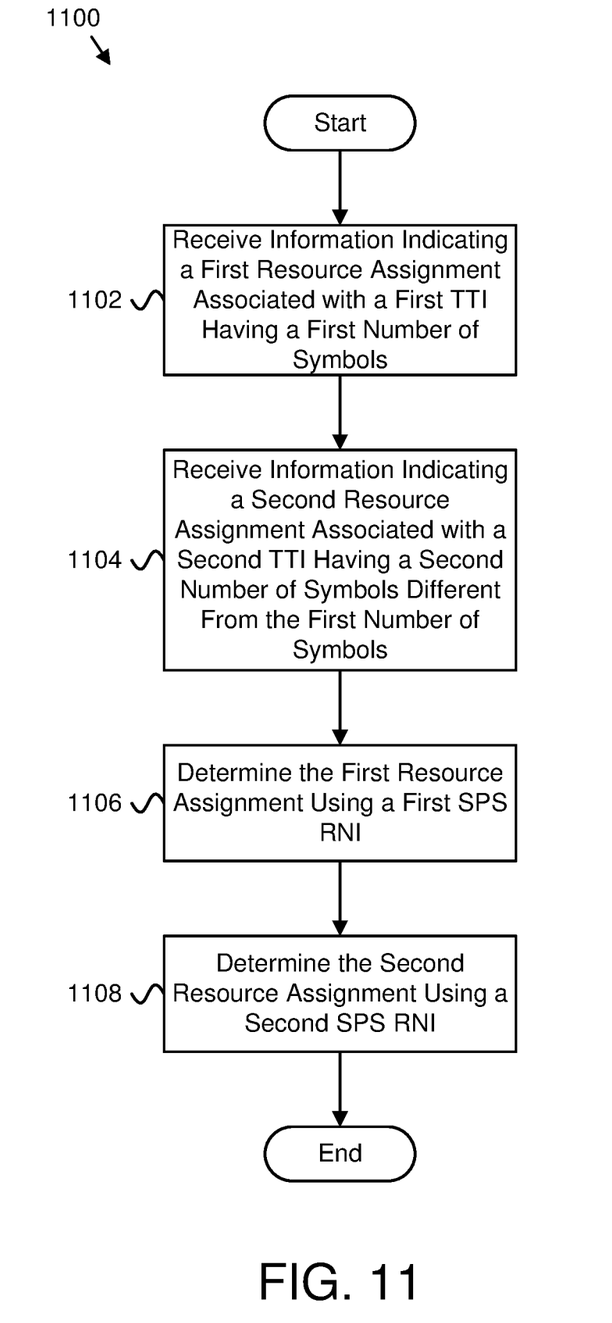
FIG. 11 is a schematic flow chart diagram illustrating another embodiment of a method for scheduling of TTIs.

FIG. 11 is a schematic flow chart diagram illustrating one embodiment of a method 1100 for scheduling of TTIs. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 information indicating a first resource assignment associated with a first TTI including a first number of symbols. The method 1100 may also include receiving 1104 information indicating a second resource assignment associated with a second TTI including a second number of symbols different from the first number of symbols. The method 1100 may include determining 1106 the first resource assignment using a first SPS RNI. The method 1100 may also include determining 1108 the second resource assignment using a second SPS RNI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
receive a physical downlink control channel (PDCCH) comprising a downlink control information (DCI) for a serving cell, wherein the DCI indicates to drop one or more scheduled uplink transmissions associated with one or more resources indicated by the DCI in response to the one or more scheduled uplink transmissions overlapping with another one or more scheduled uplink transmissions;
determine whether the PDCCH is received at least a defined time prior to the one or more scheduled uplink transmissions; and
drop the one or more scheduled uplink transmissions based on the DCI in response to determining that the PDCCH is received at least the defined time prior to the one or more scheduled uplink transmissions.

2. The UE of claim 1, wherein the PDCCH is received from a network device.

3. The UE of claim 1, wherein the one or more resources comprise time-frequency resources.

4. The UE of claim 1, wherein the one or more resources comprise resources associated with a semi-persistent grant.

5. The UE of claim 1, wherein the one or more resources have a fixed duration.

6. The UE of claim 1, wherein one or more future resources are determined for one or more future uplink transmissions to replace the one or more scheduled uplink transmissions, and the one or more future resources do not belong to the one or more resources.

7. The UE of claim 1, wherein the one or more scheduled uplink transmissions are transmittable after a time of the one or more scheduled uplink transmissions in resources indicated via a bitmap.

8. The UE of claim 1, wherein the at least one processor is configured to cause the UE to receive a semi-persistent scheduling activation command indicating frequency resources for semi-persistent scheduling data communication, and the one or more scheduled uplink transmissions are part of the semi-persistent scheduling data communication.

9. The UE of claim 1, wherein the PDCCH is processed at determined time intervals.

10. A method performed by a user equipment (UE), the method comprising:
receiving a physical downlink control channel (PDCCH) comprising a downlink control information (DCI) for a serving cell, wherein the DCI indicates to drop one or more scheduled uplink transmissions associated with one or more resources indicated by the DCI in response to the one or more scheduled uplink transmissions overlapping with another one or more scheduled uplink transmissions;
determining whether the PDCCH is received at least a defined time prior to the one or more scheduled uplink transmissions; and
dropping the one or more scheduled uplink transmissions based on the DCI in response to determining that the PDCCH is received at least the defined time prior to the one or more scheduled uplink transmissions.

11. The method of claim 10, wherein the PDCCH is received from a network device.

12. A base station, comprising:
at least one memory; and
at least one processor coupled with the at least one memory and configured to cause the base station to:
transmit a physical downlink control channel (PDCCH) comprising a downlink control information (DCI) for a serving cell, wherein:
the DCI indicates to drop one or more scheduled uplink transmissions associated with one or more resources indicated by the DCI in response to the one or more scheduled uplink transmissions overlapping with another one or more scheduled uplink transmissions; and
the one or more scheduled uplink transmissions are dropped based on the DCI in response to determining that the PDCCH is received at least a defined time prior to the one or more scheduled uplink transmissions.

13. The base station of claim 12, wherein the PDCCH is transmitted to a user equipment (UE).

14. The base station of claim 12, wherein the one or more resources comprise time-frequency resources.

15. The base station of claim 12, wherein the one or more resources comprise resources associated with a semi-persistent grant.

16. The base station of claim 12, wherein the one or more resources have a fixed duration.

17. The base station of claim 12, wherein one or more future resources are determined for one or more future uplink transmissions to replace the one or more scheduled uplink transmissions, and the one or more future resources do not belong to the one or more resources.

18. The base station of claim 13, wherein the one or more scheduled uplink transmissions are transmittable after a time of the one or more scheduled uplink transmissions in resources indicated via a bitmap.

19. The base station of claim 12, wherein the at least one processor is configured to cause the base station to transmit a semi-persistent scheduling activation command indicating frequency resources for semi-persistent scheduling data communication, and the one or more uplink transmissions are part of the semi-persistent scheduling data communication.

20. A processor for wireless communication, comprising:
at least one controller coupled with at least one memory and configured to cause the processor to:
receive a physical downlink control channel (PDCCH) comprising a downlink control information (DCI) for a serving cell, wherein the DCI indicates to drop one or more scheduled uplink transmissions associated with one or more resources indicated by the DCI in response to the one or more scheduled uplink transmissions overlapping with another one or more scheduled uplink transmissions;
determine whether the PDCCH is received at least a defined time prior to the one or more scheduled uplink transmissions; and
drop the one or more scheduled uplink transmissions based on the DCI in response to determining that the PDCCH is received at least the defined time prior to the one or more scheduled uplink transmissions.

* * * * *